Patented Mar. 20, 1951

2,545,716

UNITED STATES PATENT OFFICE 2,545,716

SULFONAMIDE RESINS

Ralph B. Thompson, Riverside, Ill., assignor to Universal Oil Products Company, Chicago, Ill., a corporation of Delaware No Drawing. Application September 27, 1947, Serial No. 776,629

11 Claims. (Cl. 260—65)

This invention relates to a method of improving the physical properties of resins formed by the condensation of a sulfonamide with a carbonyl compound selected from the group consisting of the aldehydes and ketones. More specifically, the invention concerns a process for increasing or initiating cross-linking between the amido group of a sulfonamide reactant and the carbonyl group of an aldehyde and/or a ketone to increase the melting point thereof and convert the same into more useful resinous products by incorporating into the reaction mixture prior to the condensation of the sulfonamide and the compound containing said carbonyl group a dicarbonyl compound selected from the group consisting of the dialdehydes and the diketones. It is thus one of the principal objects of the present invention to provide a process for increasing the melting point of resins prepared by the condensation of a sulfonamide reactant and a mono-carbonyl compound.

Another object of the invention is to provide a modified process for effecting the condensation of a sulfonamide compound and a carbonyl reactant to thereby decrease the solubility of the resulting resinous condensation product in organic solvents and to increase the water resistance of said resin.

Still another object to be achieved by the present process is to increase the extent of cross-linking between the individual condensate molecular chains in a formaldehyde-sulfonamide condensation product to thereby effect a conversion of the normally thermoplastic type of resin obtained by the condensation of said formaldehyde and sulfonamide to a thermal setting type of resin.

In one of its embodiments, the present process comprises a method of increasing the melting point, the water resistance and the solubility of resinous condensation products of a sulfonamide reactant with a mono-carbonyl reactant by replacing a portion of the mono-carbonyl reactant with a dicarbonyl compound selected from the group consisting of the dialdehydes and the diketones; said process being characterized by introducing said dicarbonyl compound into the reaction mixture of sulfonamide and mono-carbonyl compound prior to the condensation thereof.

In accordance with a more specific embodiment thereof, the present invention relates to a process which comprises reacting an aryl or alkane sulfonamide with a molar equivalence of a carbonyl reactant selected from the group consisting of the ketones and aldehydes wherein from about one-half of 1% to about 40% of the total of said carbonyl groups charged into the reaction mixture are derived from a dicarbonyl compound, said molar equivalence being based upon the total number of hydrogen atoms substituted on the amido nitrogen atom divided by two, which are capable of condensation with a carbonyl oxygen atom to yield a molecule of water.

Other objects and embodiments of the present invention as well as specific conditions for effecting the present process will be referred to in greater detail in the following further description of the invention.

This invention concerns a method of modifying the physical properties of resins formed by the condensation of a sulfonamide and a carbonyl compound selected from the group consisting of the aldehydes and ketones by replacing a portion of the mono-carbonyl reactant with a dicarbonyl compound selected from the dialdehydes and diketones to thereby obtain a cross-linking effect between the reactive carbonyl group of the dialdehyde and/or diketone and the amido groups of the sulfonamide reactant. It has been observed by the prior art that sulfonamide-mono-carbonyl condensation products are frequently soft at normal conditions due to the low melting point of the product, and furthermore are soluble in many organic solvents and are not sufficiently water repellent to be utilized as the resinous component of coating compositions, such as paints and varnishes; consequently their utility is generally limited to specific applications where such properties can be tolerated. In many instances, therefore, the many other desirable properties of such resins cannot be taken advantage of because of their undesirable properties in the above other respects. By means of the present invention wherein a dicarbonyl compound is incorporated into the reaction mixture of a mono-carbonyl compound and a sulfonamide to replace a portion of the mono-carbonyl reactant, the resulting resinous condensation product has many of the properties desired of these compounds for diverse uses, including its use as a coating composition component.

The so-called cross-linking effect is believed to be the result of the condensation of one or both of the hydrogen atoms of the amido group present in at least two molecules of the sulfonamide reactant (depending upon reaction conditions and the proportion of reactant charged into the condensation reaction) with the carbonyl oxygen atoms of the dicarbonyl reactant forming water and a molecular bond between the carbon atoms of one of the carbonyl groups and the nitrogen atoms of the sulfonamide amido group. The mechanism believed to be responsible for the establishment of cross-linked compounds is shown by the following structural formula:

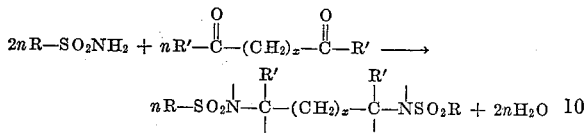

wherein R is an alkyl, aryl, aralkyl or an alicyclic radical, R' is selected from the same group or hydrogen, $n$ is a whole number, and where $x$ may be zero or a whole number. When cross-linking is obtained between the individual molecules of the reactants charged into the present process or between the condensate units formed by the condensation of a carbonyl oxygen atom with an amido group, the resulting resinous product is a high molecular weight molecule containing highly branched chain structure in which the linkages are believed to be in non-linear relationship to each other and wherein the linkages are believed to extend between chains of the adjacent condensate units forming thereby a highly complex and compact molecular arrangement. The amount of cross-linking obtained in any condensation reaction is dependent upon the amount of mono-carbonyl compound replaced by the dicarbonyl reactant. When a large number of the cross-linked type of condensation units are present in the reaction product, the latter is likely to be thermal setting and is likely to form a product which is relatively insoluble in organic solvents and to have a high degree of water repellency. In contrast to such products, the resinous condensation product formed on reaction of a mono-carbonyl reactant with the sulfonamide reactant is a resin of the thermoplastic type generally of relatively low molecular weight, low melting point and is comparatively soluble in such organic solvents as aldehydes, ethers, hydrocarbons and ketones as well as being at least physically affected by contacting the same with water or aqueous solutions.

The sulfonamide reactant herein specified as one of the primary reactants in the formation of the resinous condensation product may be selected from any of the relatively large number of compounds within the group comprising the aliphatic, cycloaliphatic, aromatic and heterocyclic compounds containing at least one sulfonamido group. Thus, the sulfonamide reactant may contain an alkane or cycloalkane hydrocarbon radical represented, for example, by such compounds as methanesulfonamide and its homologs and cyclohexane sulfonamide. Typical of the polysulfonamides utilizable in the process are such compounds as 1,2-ethanedisulfonamide and 1,4-butanedisulfonamide. In case of the alkanesulfonamide, the preferred members of this group contain up to about 8 carbon atoms per molecule and may comprise mixtures of various sulfonamide compounds such as those obtained by reacting ammonia with the acid chlorides of a mixture of alkanesulfonic acids prepared by the oxidation of the corresponding alkyl mercaptans recovered by mercaptan extraction of a sulfur-containing petroleum fraction. Alkane sulfonamides containing up to about 8 carbon atoms per molecule are especially desirable in the present process because of their greater stability and the formation of higher melting point, harder resins therefrom. Other sulfonamides utilizable in the present process comprise the sulfonamides containing an aromatic nucleus, such as the benzenoid ring. Typical compounds of this class are represented, for example, by benzenesulfonamide and its alkyl homologs such as o-, m- or p-toluenesulfonamide. The aralkyl sulfonamides such as phenylmethanesulfonamide and the aralkyldisulfonamides such as p-sulfonamidophenylmethanesulfonamide also represent typical aromatic sulfonamides utilizable herein. Of the heterocyclic mono- and polysulfonamides, typical members of this class include such compounds as the various pyridine and thiophene sulfonamides and their alkyl derivatives. The mono- and/or polysulfonamide reactant herein specified may also be substituted on one or more of the carbon atoms in the hydrocarbon residue of the compound by radicals other than sulfonamide groups such as amino, halo, alkoxy, hydroxy, carboxy, nitro or acyloxy groups as well as thioacid and carboxylic acid amide radicals. The latter groups when present in the structure of the sulfonamide reactant generally alter the physical and chemical properties of the ultimate resinous condensation product obtained in the present process.

Formaldehyde is preferred as the carbonyl compound utilized in the present process for the production of resins, although homologs of formaldehyde, such as acetaldehyde and propionaldehyde and others of higher molecular weight up to aldehydes containing about 10 carbon atoms per molecule may be utilized. Unsaturated aldehydes such as crotonaldehyde, cinnamaldehyde, acrolein, etc. or cyclic aldehydes such as benzaldehyde or heterocyclic aldehydes such as furfural or ketones of the corresponding types represent other typical compounds utilizable as the mono-carbonyl reactant involved in the present process.

The dicarbonyl reactant selected from the members of the group consisting of the dialdehydes and the diketones herein specified for incorporating with the mono-carbonylsulfonamide reactants to form the improved resinous condensation product of this invention is defined structurally as a compound having the following formula:

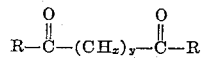

wherein $x$ may have a value from 0 to 2 inclusive, $y$ may be zero or any whole integer, generally less than about 10 and R may be selected from the group consisting of hydrogen, alkyl, aryl, aralkyl or cycloalkyl (naphthenyl) radicals. The group $—(CH_x)_y—$ may either represent an aliphatic chain or it may also be a cyclic radical such as an aromatic nucleus, as for example, a benzenoid or polycyclic radical represented, for example, by a naphthyl or phenanthryl group. Typical compounds representative of the dialdehydes and diketones utilizable as the dicarbonyl reactant in the present process are, for example, glyoxal, succinaldehyde, adipaldehyde, etc. of the saturated aliphatic series and butenyldialdehyde-1,4, pentenyldialdehyde-1,5, etc. of the unsaturated aliphatic series of dialdehydes. Diketones of the saturated and unsaturated aliphatic series may be represented by such compounds as diacetyl, acetylacetone of the saturated series of compounds and hexene-3-dione-1,5 of the unsaturated aliphatic series. Compounds containing mixed aldehyde-ketone groups such as levulinaldehyde, may also be employed herein as well as the cycloaliphatic aldehydes and ketones such as 1,4-cyclohexanedione. Typical of the aromatic dialdehydes and diketones are such compounds as isophthaldehyde (m-phthalicaldehyde) and o-, m- or p-diacetylbenzene respectively. Of the aromatic dicarbonyl compounds utilizable herein, those containing unsaturation in the side chain containing the carbonyl group are especially desirable for the present process, such as the keto or aldehyde derivatives of cinnamaldehyde. The above compounds may also contain other groups such as carboxylic, hydroxyl, amino, nitro, halo, alkoxy, etc. groups which modify the chemical and physical properties of the resulting resinous condensate product of this invention.

The resins formed by the process of this invention may also be modified in physical properties by blending with resins of other types, especially urea-aldehyde, melaminealdehyde, phenolaldehyde resins and the like. These may be blended in the finished state or the reaction with the carbonyl compound may be carried out on a mixture of the alkane sulfonamide with a phenol, urea, thiourea, melamine, dicyandiamide, an arylsulfonamide, such as pentanesulfonamide or sulfanilamide, a polycyclic-aromatic hydrocarbon such as naphthylene, or a similar material capable of forming a resinous condensation product with an aldehyde or ketone.

It is a general requisite of both the sulfonamide and carbonyl reactants as well as the other components added to the reaction mixture, that said compounds melt at temperatures below the condensation reaction temperature herein specified, thereby enabling the reactants to be completely admixed while in a molten state and permit the respective amido and keto functional group to come into intermolecular contact and effect condensation of the reacting components. Alternatively, the reactants may be dissolved in a suitable solvent as hereinafter specified which mutually dissolves the reactants and thus permits the requisite intermolecular contact of the amido and carbonyl functional groups.

The condensation reaction involved in the present process is effected at temperatures of from about 50° to about 350° C., the lower temperature limits of the above range being provided for reactants having low melting points, such as the low molecular weight sulfonamides and carbonyl reactants and for those reactants which condense rapidly at mild temperature conditions. The reaction is undesirably sluggish at temperatures below about 50° C., while at temperatures above about 350° C., excessive decomposition and degradation reactions result. In some instances, especially in case one of the above classes of starting materials melts at a high temperature, it will be preferable to employ a low molecular weight compound for the other class of starting material. Thus, the low molecular weight reactant while in a molten state dissolves the reactant melting at a higher temperature and permits the intimate admixture desirable for obtaining reaction between the functional groups of the reactants charged into the reaction. Usually, it is not necessary to employ superatmospheric pressures in carrying out the reaction, except in those cases in which a low boiling reactant and/or a high temperature is utilized to effect the reaction, thereby maintaining the latter material in the desired liquid phase during the reaction.

In some instances, it may be advantageous to employ a catalyst of an acidic or dehydrating nature which enhances the condensation reaction herein provided, such as zinc chloride, oxalic acid, hydrogen fluoride and the like, present in the reaction in amounts of from about 0.5 to about 5% by weight of the reaction mixture.

The proportion of reactants employed in the condensation reaction will vary in accordance with the type and number of sulfonamide groups and carbonyl groups in each of the respective classes of reactants. In the case of a monosulfonamide reactant, an equimolecular proportion of the carbonyl reactant will theoretically condense with a given proportion of the sulfonamide reactant in which the total number of amide groups per molecule is the same as the total number of keto groups per molecule. In correlating the molecular ratios of the sulfonamide and carbonyl reactants utilized in the present process, it may be said that the carbonyl group is mono-functional with respect to a sulfonamido group ($-SO_2NH_2$) and the proportions of the respective reactants are so adjusted that there are at least equi-functional amounts of the total number of carbonyl groups present in the reaction mixture and sulfonamido groups present therein. In cases wherein a linear sulfonamide condensation product having a low melting point would normally form on reacting the sulfonamide and mono-carbonyl reactants, even small amounts (as low as from about 1 to about 10%) of the dicarbonyl reactant may be sufficient to convert the normally thermoplastic mono-carbonyl-sulfonamide condensation product into a higher melting or even a thermal setting resin by the establishment of cross-linkages between the linear condensation chains. It is within the scope of the present process to effect the condensation reaction in the presence of a solvent which is miscible with the reactive starting materials and/or resinous product. The solvent, when utilized, may be selected from the hydrocarbons having suitable boiling points such as hexane, pentane, petroleum ether and in some cases non-hydrocarbon solvents such as diphenyl oxide, and other ethers such as dipropylether, dibutylether, etc. may be employed. It is preferred to utilize a solvent which boils at a temperature above the reaction temperature required for the condensation reaction, although in some instances, the solvent may be present in the reaction mixture for the express purpose of providing a refluxing medium which maintains the temperature of reaction at a constant value, the boiling point of the solvent. The solvent may also be expressly added to the reaction mixture to form an azeotrope with the water liberated during the condensation reaction, thus providing a means for removing the latter by-product from the reaction mixture, either during the condensation reaction or following the formation of the product. In many cases it is desirable to employ the solvent as a diluent of the reactants so as to control the rate of reaction or the temperature developed in the reaction mixture. When such precautions are taken, the product usually has a more desirable color and its other physical properties such as flexibility and hardness are improved.

After completion of the initial condensation reaction and the separation of the product thereof from the reaction mixture, the resin may be pulverized into a finely divided condition suitable for subsequent molding operations, mixing into protective or covering compositions or for utilization in the manufacture of other compositions, such as plastics. In case an excess of either reactant is employed in the condensation reaction, or if the initial stage of the reaction is not allowed to proceed to complete condensation of the components, the reaction product separated from the initial stage of the condensation may be further reacted with additional quantities of either of the reactants to form a product having properties differing from the initial or partial condensation product. The final stage of the reaction or completion of the condensation reaction present in the partially condensed product may be effected in a heated mold or other shaping apparatus when desired. It has been found that a convenient means for forming molded articles is to conduct the initial reaction to a stage of partial completion and/or with an excess of the sulfonamide reactant above that amount required to react completely with all of the carbonyl groups present in the reaction mixture, forming thereby a soft resinous product which usually possesses thermoplastic properties and thereafter completing the reaction by heating the initial reaction product in the desired mold admixed with the dicarbonyl reactant, thus forming a thermal setting resinous product within the mold which is relatively little deformed at high temperatures and in general is tougher and is relatively more insoluble in various solvents than the initial or partial condensation product.

Resinous products obtained in the present process have widespread utility in various arts, depending largely upon the physical properties of the product. The resin, for example, may be composited with various drying oils, such as the glyceride type or unsaturated hydrocarbon type, to form varnishes or paint compositions, and when employed for this purpose the resins contribute valuable film-forming and bodying properties to the composition. Protective coatings prepared from the present resin form a glossy surface which is resistant to chemicals, water, and abrasive agents and dry to hard, non-tacky films. When solid resinous products of the thermoplastic type are obtained, these may be melted or extruded into variously shaped articles or used to impregnate cellulosic materials such as paper or shaped wooden articles, or the resin may be heated with wood flour, wood chips, cotton linters, asbestos or other fibrous materials to form semi-rigid to rigid structural shapes.

The following example is introduced for the purpose of illustrating the present process and the properties of the product obtained from the condensation of typical reactants as disclosed herein. In citing a specific application of the invention, it is not intended, however, to limit the generally broad scope of the invention in accordance with the conditions or reactants utilized therein.

A mixture of ethanesulfonamide (21.8 g.) 36% aqueous formalin (15.9 g.), and glyoxal (0.35 g.) was stirred and heated in a bath at 110° C. under reflux. Oxalic acid (2.0 g.) was added as a catalyst. At intervals of 1.5 hours, 0.5 cc. of the reaction mixture was withdrawn and analyzed for carbonyl content by reaction with hydroxylamine hydrochloride and titration of the liberated hydrochloric acid. When the carbonyl content became constant, the reaction was assumed to be complete. It was then neutralized with 10% sodium hydroxide followed by removal of water and other volatile materials by heating under vacuum. The product, a resin, was crushed and washed with water to remove the inorganic salts. This product was a resinous solid material having a clear, pale yellow color and had a softening point above 200° F.

In this example glyoxal constitutes about 5% of the carbonyl groups. When the reaction is carried out without glyoxal the product has a softening point below room temperature.

I claim as my invention:

1. The process of claim 5 further characterized in that said condensation reaction is effected at a temperature within the range of from about 50° to about 350° C. and at a pressure sufficient to maintain substantially liquid phase.

2. A method of increasing the melting point of a sulfonamide-formaldehyde resinous condensation product which comprises replacing a portion, up to about 40% by weight, of the formaldehyde with a dicarbonyl reactant selected from the group consisting of the dialdehydes and diketones in an amount sufficient to provide a total number of carbonyl groups present in the reaction mixture at least equivalent to the total number of amide groups present in the sulfonamide reactant and thereafter effecting the condensation of said reactants at condensation reaction conditions to form said resinous product.

3. The process of claim 2 further characterized in that said dicarbonyl reactant is glyoxal.

4. A process for the preparation of a resinous condensation product which comprises reacting ethanesulfonamide with a mixture of glyoxal and formaldehyde in the presence of from about 0.5 to about 5% by weight of the reaction mixture of oxalic acid, the proportion of reactants being such that the total number of carbonyl groups is at least equal to the total number of sulfonamido groups and the number of carbonyl groups derived from glyoxal is equal to from about 0.5 to about 40% of the total number of carbonyl groups.

5. A process for the preparation of a resinous condensation product which comprises reacting at condensation reaction conditions a sulfonamide with a mono-carbonyl compound from the group consisting of the aldehydes and ketones containing only one carbonyl radical and with a dicarbonyl compound from the group consisting of the dialdehydes and diketones, said dicarbonyl compound being in an amount sufficient to supply from about 0.5 to about 40% of the total number of carbonyl groups present in the reaction mixture.

6. The process of claim 5 further characterized in that said mono-carbonyl compound is an aliphatic compound containing less than 10 carbon atoms per molecule.

7. The process of claim 5 further characterized in that said sulfonamide is a disulfonamide.

8. The process of claim 5 further characterized in that the condensation reaction is effected in the presence of an acidic catalyst comprising from about 0.5 to about 5% by weight of the reaction mixture.

9. The process of claim 5 further characterized in that said sulfonamide is an alkane sulfonamide.

10. A process for the preparation of a resinous condensation product which comprises reacting at condensation reaction conditions a sulfonamide with a mono-aldehyde and a dicarbonyl compound from the group consisting of the dialdehydes and diketones, the proportion of said reactants being such that the total number of carbonyl groups in the reaction mixture is at least equal to the total number of sulfonamide groups and the number of carbonyl groups derived from said dicarbonyl compound is equal to from about 0.5 to about 40% of the total number of carbonyl groups.

11. The process of claim 10 further characterized in that said dicarbonyl compound is a dialdehyde.

RALPH B. THOMPSON.

REFERENCES CITED

The following references are of record in the file of this patent:

UNITED STATES PATENTS

| Number | Name | Date |
| --- | --- | --- |
| 2,332,898 | D'Alelio | Oct. 26, 1943 |